US006919685B1

(12) United States Patent
Henderson et al.

(10) Patent No.: US 6,919,685 B1
(45) Date of Patent: Jul. 19, 2005

(54) MICROSPHERE

(75) Inventors: Timothy M. Henderson, Ypsilanti, MI (US); Donald K. Wedding, Toledo, OH (US)

(73) Assignee: Imaging Systems Technology INC, Toledo, OH (US)

( * ) Notice: Subject to any disclaimer, the term of this patent is extended or adjusted under 35 U.S.C. 154(b) by 269 days.

(21) Appl. No.: 10/252,379

(22) Filed: Sep. 24, 2002

Related U.S. Application Data

(62) Division of application No. 09/967,922, filed on Oct. 2, 2001, now abandoned, which is a continuation of application No. 09/756,230, filed on Jan. 9, 2001, now abandoned.

(51) Int. Cl.[7] ............................ H01J 17/49; B32B 5/16

(52) U.S. Cl. ........................ 313/582; 428/332; 428/336; 428/402.2; 427/157; 313/485; 313/568

(58) Field of Search ................................ 428/332, 336, 428/402.2; 427/157; 313/485, 568, 5

(56) References Cited

U.S. PATENT DOCUMENTS

| | | | | | |
|---|---|---|---|---|---|
| 3,176,742 | A | | 4/1965 | Nakayama et al. | 313/182 |
| 3,499,167 | A | | 3/1970 | Baker et al. | 315/169 |
| 3,559,190 | A | | 1/1971 | Bitzer et al. | 340/173 |
| 3,603,836 | A | | 9/1971 | Grier | 313/201 |
| 3,607,169 | A | | 9/1971 | Coxe | 65/21 |
| 3,646,354 | A | | 2/1972 | Lay | 313/109.5 |
| 3,836,393 | A | | 9/1974 | Ernsthausen et al. | 117/217 |
| 3,846,171 | A | | 11/1974 | Byuum, Jr. et al. | 117/223 |
| 3,860,846 | A | | 1/1975 | Mayer | 313/491 |
| 3,886,390 | A | | 5/1975 | Maloney et al. | 313/217 |
| 3,886,404 | A | | 5/1975 | Kurahashi et al. | 315/169 TV |
| 3,964,050 | A | | 6/1976 | Mayer | 340/324 |
| 4,035,689 | A | | 7/1977 | Ogle et al. | 315/169 TV |
| 4,035,690 | A | * | 7/1977 | Roeber | 345/41 |
| 4,080,597 | A | | 3/1978 | Mayer et al. | 340/324 M |
| 4,126,807 | A | | 11/1978 | Wedding et al. | 313/188 |
| 4,126,809 | A | | 11/1978 | Wedding et al. | 313/221 |
| 4,233,623 | A | | 11/1980 | Pavliscak | 358/240 |
| 4,303,732 | A | | 12/1981 | Torobin | 428/333 |
| 4,320,418 | A | | 3/1982 | Pavliscak | 358/240 |
| 4,349,456 | A | | 9/1982 | Sowman | 252/317 |
| 4,494,038 | A | | 1/1985 | Wedding et al. | 313/587 |
| 4,532,505 | A | | 7/1985 | Holz et al. | 340/775 |
| 4,827,186 | A | | 5/1989 | Knauer et al. | 313/485 |
| 4,926,095 | A | | 5/1990 | Shinoda et al. | 315/169.4 |
| 5,075,597 | A | | 12/1991 | Salavin et al. | 315/169.4 |
| 5,107,182 | A | | 4/1992 | Sano et al. | 315/169.4 |
| 5,782,469 | A | | 1/1993 | Sano | 313/485 |
| 5,446,344 | A | | 8/1995 | Kanazawa | 315/169.4 |
| 5,500,287 | A | * | 3/1996 | Henderson | 428/403 |
| 5,501,871 | A | | 3/1996 | Henderson | 427/160 |
| 5,541,479 | A | * | 7/1996 | Nagakubo | 313/586 |
| 5,640,068 | A | | 6/1997 | Amemiya | 313/582 |
| 5,661,500 | A | | 8/1997 | Shinoda et al. | 345/60 |
| 5,674,553 | A | * | 10/1997 | Shinoda et al. | 427/68 |
| 5,742,122 | A | * | 4/1998 | Amemiya et al. | 313/582 |
| 5,793,158 | A | * | 8/1998 | Wedding, Sr. | 313/493 |

* cited by examiner

*Primary Examiner*—Samuel A. Acquah

(57) ABSTRACT

This invention comprises the use of microspheres containing ionizable gas in a gas discharge (plasma) display, photons for the gas discharge within a microsphere exciting a phosphor such that the phosphor emits wavelengths in both the visible or invisible spectrum. The invention is described in detail hereinafter with reference to an AC gas discharge (plasma) display.

7 Claims, 4 Drawing Sheets

MICROSPHERE

RELATED APPLICATION

This is a division patent application under 35 USC 121 of copending U.S. application Ser. No. 09/967,922 filed Oct. 2, 2001, now abandoned, which is a continuation under 35 USC 120 of U.S. application Ser. No. 09/756,230, filed Jan. 9, 2001 now abandoned.

BACKGROUND

1. Field of the Invention

This invention relates to a gas discharge (plasma) structure wherein an ionizable gas is confined within an enclosure and is subjected to sufficient voltage(s) to cause the gas to discharge.

Examples of gas discharge (plasma) devices contemplated in the practice of this invention include both monochrome (single color) AC plasma displays and multi-color (two or more colors) AC plasma displays.

Examples of monochrome AC gas discharge (plasma) displays contemplated in the practice of this invention are well known in the prior art and include those disclosed in U.S. Pat. No. 3,559,190 issued to Bitzer et al., U.S. Pat. No. 3,499,167 (Baker et al), U.S. Pat. No. 3,860,846 (Mayer) U.S. Pat. No. 3,964,050 (Mayer), U.S. Pat. No. 4,080,597 (Mayer) and U.S. Pat. No. 3,646,384 (Lay) and U.S. Pat. No. 4,126,807(Wedding), all incorporate herein by reference.

Examples of multicolor AC plasma displays contemplated in the practice of this invention are well known in the prior art and include those disclosed in U.S. Pat. No. 4,233,623 issued to Pavliscak, U.S. Pat. No. 4,320,418 (Pavliscak), U.S. Pat. No. 4,827,186 (Knauer, et al.), U.S. Pat. No. 5,661,500 (Shinoda et al.), U.S. Pat. No. 5,674,553 (Shinoda, et al.), U.S. Pat. No. 5,107,182 (Sano et al.), U.S. Pat. No. 5,182,489 (Sano), U.S. Pat. No. 5,075,597 (Salavin et al), U.S. Pat. No. 5,742,122 (Amemiya, et al.), U.S. Pat. No. 5,640,068 (Nagakubi) and U.S. Pat. No. 5,793,158 (Wedding), all incorporated herein by reference.

In addition, this invention may be practiced in a DC gas discharge (plasma) display, for example as disclosed in U.S. Pat. No. 3,886,390 (Maloney et al.), U.S. Pat. No. 3,886,404 (Kurahashi et al.), U.S. Pat. No. 4,035,689 (Ogle et al.) and U.S. Pat. No. 4,532,505 (Holz et al.), all incorporated herein by reference.

2. Related Prior Art

This invention relates to the use of microspheres containing an ionizable gas in a gas discharge plasma display.

U.S. Pat. No. 4,035,690 issued to Roeber discloses a plasma panel display with a plasma forming gas encapsulated in clear glass spheres. Roeber used commercially available glass spheres containing gases such as air, $SO_2$ or $CO_2$ at pressures of 0.2 to 0.3 atmosphere. Roeber discloses the removal of these residual gases by heating the glass spheres at an elevated temperature to drive out the gases through the heated walls of the glass sphere. Roeber obtains different colors from the glass spheres by filling each sphere with a gas mixture which emits a color upon discharge and/or by using glass sphere made from colored glass.

SUMMARY OF THE INVENTION

This invention comprises the use of microspheres containing ionizable gas in a gas discharge (plasma) display, photons for the gas discharge within a microsphere exciting a phosphor such that the phosphor emits wavelengths in both the visible or invisible spectrum. The invention is described in detail hereinafter with reference to an AC gas discharge (plasma) display.

DESCRIPTION OF THE INVENTION

In accordance with the practice of this invention the gas discharge space within a gas discharge plasma display device comprises one or more hollow microspheres, each hollow microsphere containing an ionizable gas mixture capable of forming a gas discharge when a sufficient voltage is applied to opposing electrodes in close proximity to the microsphere.

Figure 1:
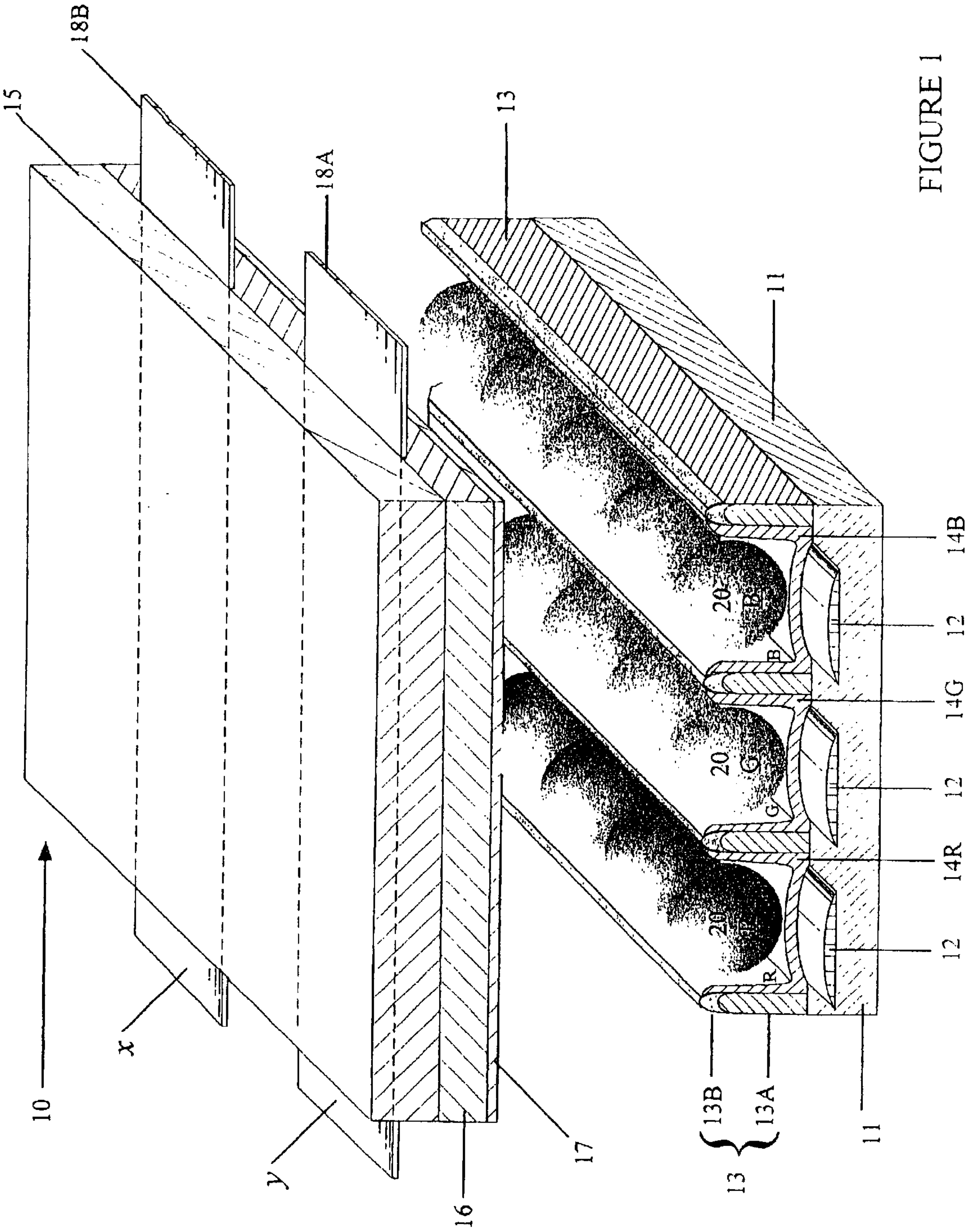
FIG. 1 shows a prospective view of an AC gas discharge (plasma) display with microspheres.
Figure 2:
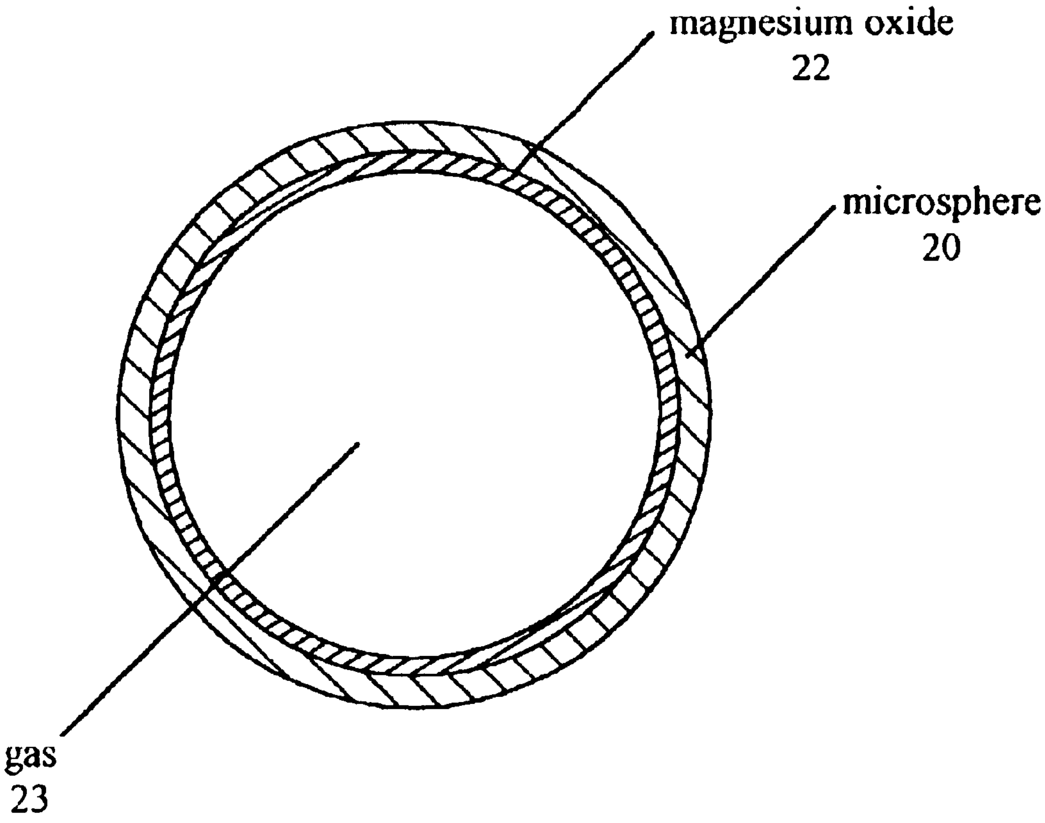
FIG. 2 shows a cross-section view of a microsphere embodiment used in FIG. 1.

FIG. 1 shows microspheres 20R, 20G, 20B of this invention positioned in a gas discharge plasma display panel structure 10 similar to the structure illustrated and described in FIG. 2 of U.S. Pat. No. 5,661,500 (Shinoda et al.) which is cited above and incorporated herein by reference. The panel structure 10 has a bottom or rear glass substrate 11 with electrodes 12, barriers 13, phosphor 14R, 14G, 14B, and microspheres 20 R, 20G, 20B. Each microsphere 20R, 20G, 20B, contains an ionizable gas.

The top substrate 15 is transparent for viewing and contains y electrode 1 BA and x electrode 18B, dielectric layer 16 covering the electrodes 18A and 18B, and dielectric protective layer 17 covering the surface of dielectric 16.

Each electrode 12 on the bottom substrate 11 is called a column data electrode. The y electrode 18A on the top substrate 15 is the row scan electrode and the x electrode 18B on the top substrate 15 is the bulk sustain electrode. The gas discharge is initiated by voltages applied between a bottom column data electrode 12 and a top y row scan electrode 18A. The sustaining of the resulting discharge is done between the electrode pair of the top y row scan electrode 18A and the top x bulk sustain electrode 18B.

The basic electronic architecture for applying voltages to the three electrodes 12, 18A, 18B is disclosed in U.S. Pat. No. 5,446,344 issued to Yoshikazu Kanazawa of Fujitsu. This basic architecture is widely used in the industry for addressing and sustaining AC gas discharge (plasma) displays and has been labeled by Fujitsu as ADS (Address Display Separately). In addition to ADS, other suitable architectures are known in the art and are available for addressing and sustaining the electrodes 12, 18A, and 18B of FIG. 1 and FIG. 4.

Phosphor 14R emits red luminance when excited by photons from the gas discharge within the microsphere 20R.

Phosphor 14G emits green luminance when excited by photons from the gas discharge within the microsphere 20G.

Phosphor 14B emits blue luminance when excited by photons for the gas discharge within the microsphere 20B.

The barriers 13 have a top portion 13B containing a black colorant for improved contrast. The lower portion barrier 13A may be white, black, transparent or translucent.

FIG. 2 shows a cross-sectional view of a microsphere 20 used in FIG. 1 with external surface 20-1 and internal surface 20-2, an internal magnesium oxide layer 22, and ionizable gas 23.

Magnesium oxide increases the ionization level through secondary ion emission that in turn leads to reduced gas discharge voltages.

Magnesium oxide is prone to sputtering which adversely affects the life of the display. The magnesium oxide layer 22 on the inner surface 20B of the microsphere 20 will prime the gas 23, and will also be separate from the phosphor which is located outside of the microsphere 20.

Magnesium oxide is susceptible to contamination. To avoid contamination, gas discharge (plasma) displays are assembled in clean rooms that are expensive to construct and maintain. In traditional plasma panel production, magnesium oxide is typically applied to an entire substrate surface. At this point the magnesium oxide is vulnerable to contamination. In contrast, with the magnesium oxide layer 22 on the inside surface 20B of the microsphere 20, exposure of the magnesium oxide to contamination is minimized.

The magnesium oxide layer 22 may be applied to the inside of the microsphere 20 by using a process similar to the technique disclosed by U.S. Pat. No. 4,303,732 (Torobin). In this process, magnesium vapor is incorporated as part of the ionizable gases introduced into the microsphere while the microsphere is at an elevated temperature.

In some embodiments the magnesium oxide may be present as particles in the gas. In some embodiments, the magnesium oxide may be omitted.

Figure 3:
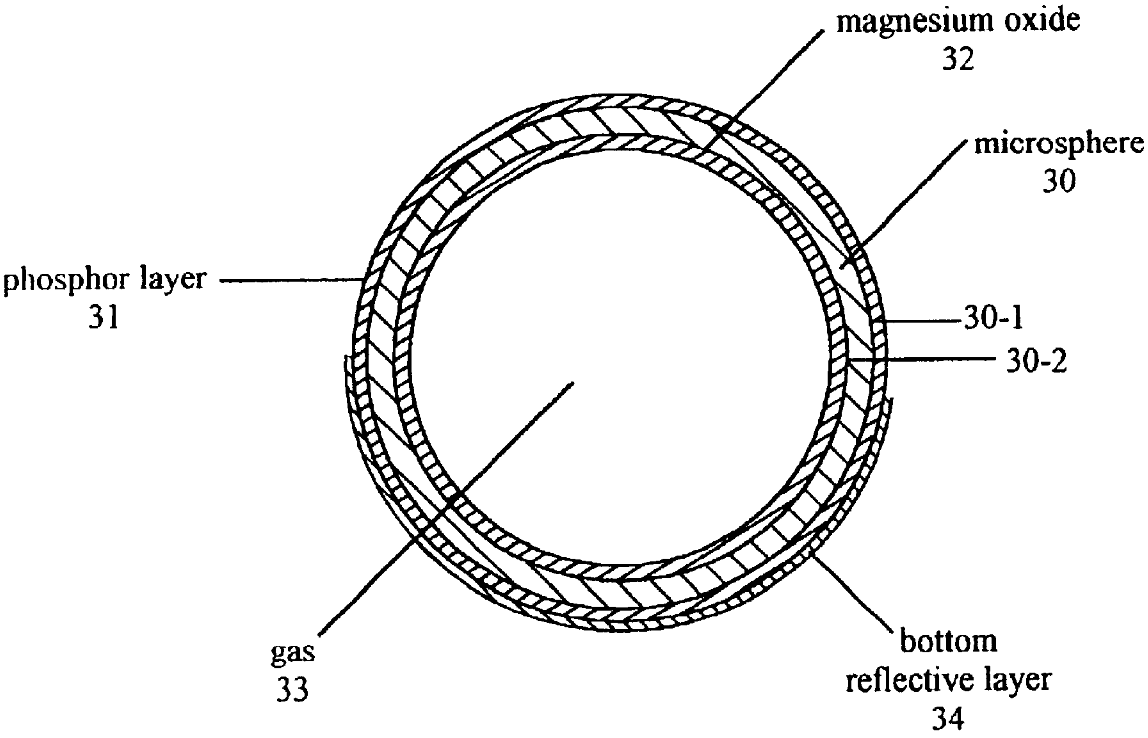
FIG. 3 shows a cross-section view of another microsphere embodiment.

FIG. 3 shows a cross-sectional view of a microsphere 30 with external surface 30-1 and internal surface 30-2, an external phosphor layer 31, internal magnesium oxide layer 32, ionizable gas 33, and an external bottom reflective layer 34.

The bottom reflective layer 34 is optiorial and, when used, will cover about half of the phosphor layer 31 on the external surface 30A. This bottom reflective layer 34 will reflect light upward that would otherwise escape and increase the brightness of the display.

Figure 4:
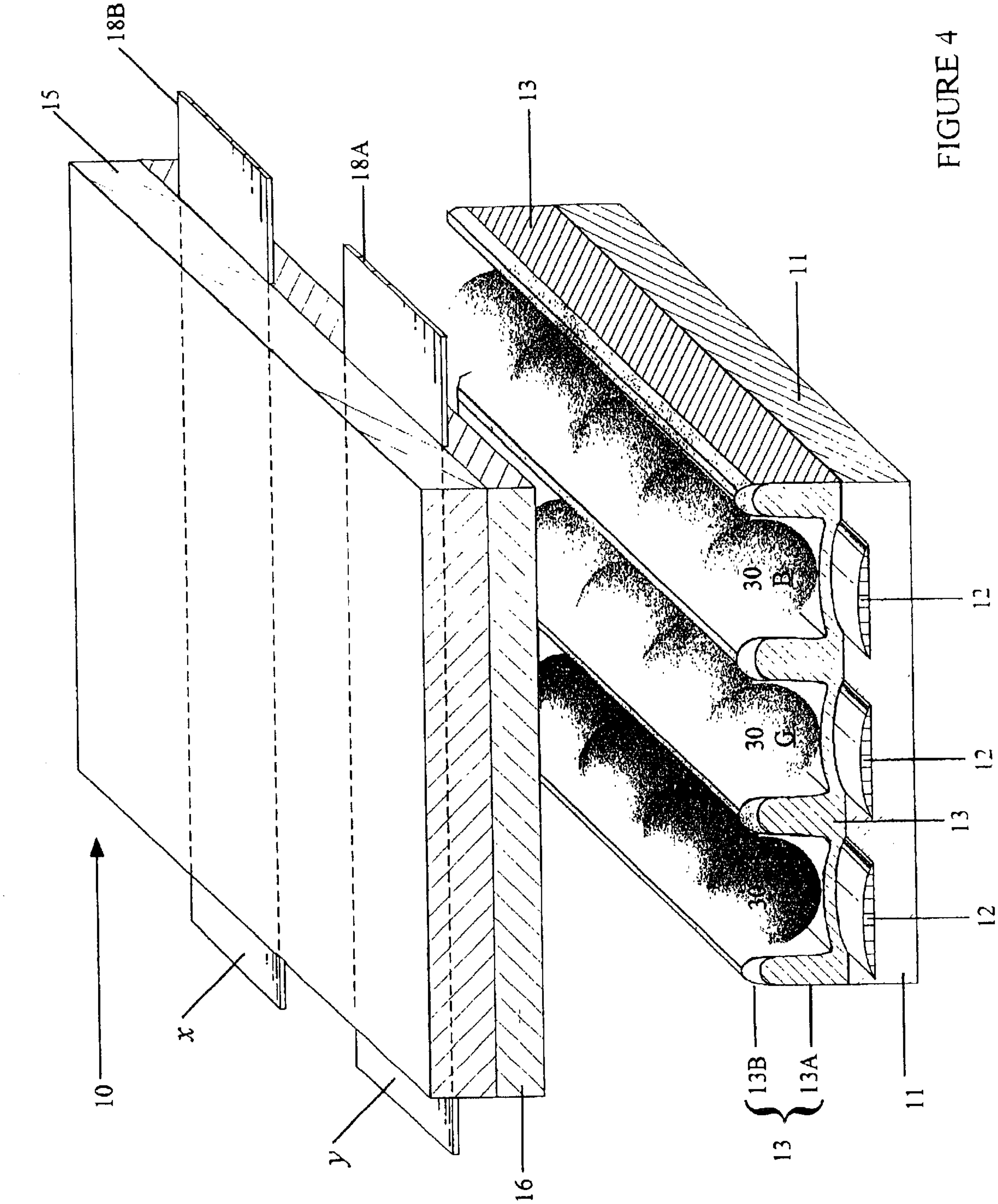
FIG. 4 is a prospective view of a variation of the display structure in FIG. 1.

FIG. 4 is a variation of FIG. 1 and shows another embodiment of this invention. In this embodiment, the microsphere 30 is used in the plasma display structure of FIG. 4. The protective layer 17 and the phosphor 14R, 14G, 14B as shown in the FIG. 1 structure are omitted form the FIG. 4 structure. In this FIG. 4 structure, the microsphere 30 of FIG. 3 has an internal magnesium oxide layer 32 and an external phosphor layer 31 which is excited by photons from the gas discharge within the microsphere. The phosphor 31 is selected to emit the desired visible or invisible wavelength of light, e.g., red, blue, or green in a multicolor plasma display.

The electrodes 12, 18A, and 18B are in sufficient close proximity to the microspheres so that a gas discharge results inside the microsphere. Direct contact of electrodes with the spheres may be appropriate. Although FIGS. 1 and 4 are shown with a single row of microspheres in each channel or groove formed by the barriers 13, there may be a plurality rows or layers of microspheres randomly or selectively arranged in stacks in the channel or groove.

The microspheres may be constructed of any suitable material. In one embodiment of this invention, the microsphere is made of glass, ceramic, quartz, or like amorphous and/or crystalline materials including mixtures of such.

In other embodiments it is contemplated that the microsphere is made of plastic, metal, metalloid, or other such materials including mixtures or combinations thereof.

Inorganic compounds of metals and metalloids are contemplated including oxides of titanium, zirconium, hafnium, gallium, silicon, aluminum, lead, zinc, and so forth.

For secondary ion emission a microsphere may be made in whole or in part from one or more materials having a sufficient Townsend coefficient. These include inorganic compounds of magnesium, calcium, strontium, barium, gallium, lead, and the rare earths especially lanthanum, cerium, actinium, and thorium. The contemplated inorganic compounds include oxides, silicates, nitrides, carbides, and other inorganic compounds of the above and other elements.

The use of secondary ion materials in a plasma display is disclosed in U.S. Pat. No. 3,716,742 issued to Nakayama et al. The use of Group IIa compounds including magnesium oxide is disclosed in U.S. Pat. Nos. 3,836,393 and 3,846,171. The use of rare earth compounds in an AC plasma display is disclosed in U.S. Pat. Nos. 4,126,807; 4,126,809; and 4,494,038, all issued to Wedding et al.

The secondary ion emission material such as magnesium oxide may be a layer on the internal surface of a microsphere. The secondary ion material may also be dispersed or suspended as particles within the ionizable gas. As disclosed hereinafter, phosphor particles may also be dispersed or suspended in the gas, or may be affixed to the inner surface of the microsphere.

The hollow microspheres are formed and filled with an ionizable gas mixture as disclosed in U.S. Pat. No. 5,500,287 issued to Timothy M. Henderson which is incorporated herein by reference.

In Henderson 287, the hollow microspheres are formed by dissolving a permeant gas (or gases) into glass frit particles. The gas permeated frit particles are then heated at a high temperature sufficient to blow the frit particles into hollow microspheres containing the permeant gases.

In Henderson 287, the gases may be subsequently out-permeated and evacuated from the hollow sphere as described in step D in column 3 of Henderson. In the practice of this invention, a portion of the gas or gases is not out-permeated and is retained within the hollow microsphere to provide a hollow microsphere containing an ionizable gas.

U.S. Pat. No. 5,501,871 (Henderson) also describes the formation of hollow microspheres and is incorporated herein by reference.

Other methods for forming hollow microspheres are disclosed in the prior art including U.S. Pat. No. 4,303,732 (Torobin), U.S. Pat. No. 3,607,169, (Coxe), and U.S. Pat. No. 4,349,456 (Sowman), all of which are incorporated herein by reference.

The hollow microsphere(s) as used in the practice of this invention contain(s) one or more ionizable gas components. As used herein, ionizable gas or gas means one or more gas components. In the practice of this invention, the gas is typically selected from the rare gases of neon, argon, xenon, krypton, helium, and/or radon. The rare gas may be a Penning gas mixture. Other gases such as nitrogen, $CO_2$, mercury, and hydrogen are contemplated.

In one embodiment, a two-component gas mixture (or composition) is used such as a mixture of argon and xenon, argon and helium, xenon and helium, neon and argon, neon and xenon, neon and helium, and neon and krypton.

Specific two-component gas mixtures (compositions) include 5 to 90% atoms of argon with the balance xenon.

Another two-component gas mixture is a mother gas of neon containing 0.05 to 5% atoms of xenon, argon, or krypton. This can also be a three-component or four-component gas by using small quantities of xenon, argon, and krypton.

In another embodiment, a three-component ionizable gas mixture is used such as a mixture of argon, xenon, and neon wherein the mixture contains at least 5% to 80% atoms of argon, up to 10% xenon, and the balance neon. The xenon is present in a minimum amount sufficient to maintain the Penning effect. Such a mixture is disclosed in U.S. Pat. No. 4,926,095 (Shinoda et al.), incorporated herein by reference.

The gas pressure inside of the hollow sphere may be less than atmospheric. The typical sub-atmospheric pressure is about 200 to 760 Torr. However, pressures above atmospheric may be used depending upon the structural integrity of the microsphere.

In the prior art, gas discharge (plasma) displays are operated with the ionizable gas at a pressure below atmospheric. Gas pressures above atmospheric are not used because of structural problems. Higher gas pressures above atmospheric may cause the display substrates to separate, especially at elevations of 4000 feet or more above sea level. Such separation may also occur between a substrate and a viewing envelope or dome in a single substrate or monolithic plasma panel structure described hereinafter.

In one embodiment of this invention, the gas pressure inside of the microsphere is less than atmospheric, about 200 to about 760 Torr, typically about 400 to about 600 Torr.

In another embodiment of this invention, the gas pressure inside of the microsphere is greater than atmospheric. Depending upon the structural strength of the microsphere, the pressure above atmospheric may be about 1 to 250 atmospheres (760 to 190,000 Torr). Higher gas pressures increase the luminous efficiency of the plasma display.

One or more microspheres is positioned inside of a gas discharge (plasma) display device. As disclosed and illustrated in the gas discharge display patents cited above and incorporated herein by reference, the microspheres may be positioned in one or more channels or grooves of a plasma display structure as disclosed in Shinoda 500, 553, or Wedding 158. The microspheres may also be positioned within a cavity, well, or hollow of a plasma display structure as disclosed by Knauer 186.

One or more hollow microspheres containing the ionizable gas is located within the display panel structure in close proximity to opposing electrodes.

The opposing electrodes may be of any geometric shape or configuration. In one embodiment the opposing electrodes are opposing arrays of electrodes, one array of electrodes being transverse or orthogonal to an opposing array of electrodes.

The electrode in each opposing array can be parallel, zig zag, serpentine, or like pattern as typically used in dot-matrix gas discharge (plasma) displays. The use of split or divided electrodes is contemplated as disclosed in U.S. Pat. No. 3,603,836 (Grier).

The electrodes in each opposing transverse array are transverse to the electrodes in the opposing array so that each electrode in each array forms a crossover with an electrode in the opposing array, thereby forming a multiplicity of crossovers. Each crossover of two opposing electrodes forms a discharge point or cell. At least one hollow microsphere containing ionizable gas is positioned in the gas discharge (plasma) display device at the intersection of two opposing electrodes. When an appropriate voltage potential is applied to an opposing pair of electrodes, the ionizable gas inside of the microsphere at the crossover is energized and a gas discharge occurs. Photons of light in the visible and/or invisible range are emitted by the gas discharge. Neon produces visible light (neon orange) whereas the other rare gases emit light in the non-visible ultraviolet range.

The photons of light pass through the shell or wall of the microsphere and excite a phosphor located outside of the microsphere. This phosphor may be located on the side wall(s) of the channel, groove, cavity, well, hollow or like structure of the discharge space. In one particular embodiment of this invention, a layer, coating, or particles of phosphor is located on the exterior wall of the microsphere. In another embodiment the phosphor is inside the microsphere.

The gas discharge within the channel, groove, cavity, well or hollow produces photons that excite the phosphor such that the phosphor emits light in a range visible to the human eye. Typically this is red, blue, or green light. In some embodiments of this invention the emitted light may not be visible to the human eye.

In prior art AC plasma displays as disclosed in Wedding 158, the phosphor is located on the wall(s) or side(s) of the barriers that form the channel, groove, cavity, well, or hollow. The phosphor may also be located on the bottom of the channel, or groove as disclosed by Shinoda et al 500 or the bottom cavity, well, or hollow as disclosed by Knauer et al 186.

In one embodiment of this invention, microspheres are positioned within the channel, groove, cavity, well, or hollow such that photons from the gas discharge within the microsphere causes the phosphor along the wall(s, side(s) or at the bottom of the channel, groove, cavity, well, or hollow, to emit light.

In another embodiment of this invention, phosphor is located on the outside surface of each microsphere as shown in FIG. 3. In this embodiment, the outside surface is at least partially covered with phosphor that emits light when excited by photons from the gas discharge within the microsphere.

In another embodiment of this invention, phosphor particles are dispersed and/or suspended within the ionizable gas inside each microsphere. In this embodiment the phosphor particles are sufficiently small such that most of the phosphor particles remain suspended within the gas and do not precipitate or otherwise substantially collect on the inside wall of the microsphere. Typically the mean diameter of the dispersed and/or suspended phosphor particles is less than about 0.1 micron. As disclosed herein above, particles of secondary ion emission material such as magnesium oxide may also be suspended within the ionizable gas.

In the practice of this invention the microsphere may be color tinted or constructed of materials that are color tinted with red, blue, green, yellow, etc pigments. This is disclosed in Roeber 690 cited above. The gas discharge may also emit color light of different wavelengths as disclosed in Roeber 690.

The use of tinted materials and/or gas discharges emitting light of different wavelengths may be used in combination with the above described phosphors and the light emitted therefrom.

The present gas filling techniques used in the manufacture of gas discharge (plasma) display devices comprise introducing the gas mixture through an aperture into the device. This is a gas injection hole. The manufacture steps typically include heating and baking but the assembled device (before gas fill) at a high-elevated temperature under vacuum for 2 to 12 hours. The vacuum is obtained via external suction through a tube inserted in the aperture.

The bake out is followed by back fill of the device with an ionizable gas introduced through the tube and aperture. The tube is then sealed-off.

This bake out and gas fill process is the major production bottleneck in the manufacture of gas discharge (plasma) display devices, requiring substantial capital equipment and a large amount of process time.

For color AC plasma display panels of 40 to 50 inches in diameter, the bake out and vacuum cycle may be up to 30 hours per panel or over 30 million hours per year for a manufacture facility producing over 1 million plasma panels per year.

The gas-filled microspheres used in this invention can be produced in large economical volumes and added to the gas discharge (plasma) display device without the necessity of bake out and gas process capital equipment. The savings in capital equipment cost and operations costs are substantial.

The microspheres are conveniently added to the gas discharge space between opposing electrodes before the device is sealed. An aperture and tube can be used for bake out if needed, but the costly gas fill operation is eliminated.

The presence of the microspheres inside of the display device also adds structural support and integrity to the device. The present color AC plasma displays of 40 to 50 inches are fragile with a high breakage rate in shipment and handling.

The microspheres may be of any suitable volumetric shape or geometric configuration including spherical, oblate spheroid, or prolate spheroid.

The size of the microspheres used in the practice of this invention may vary over a wide range. In a gas discharge display, the average diameter of a microsphere is about 1 mil to about 10 mils (where one mil equals 0.001 inch) or about 25 microns to about 250 microns. Microspheres can be manufactured up to 80 mils or about 2000 microns in diameter. The thickness of the wall of each hollow microsphere must be sufficient to retain the gas inside, but thin enough to allow passage of photons emitted by the gas discharge. The wall thickness of plasma panel microspheres should be kept as thin as practical to minimize ultraviolet (uv) absorption, but thick enough to retain sufficient strength so that the microspheres can be easily handled and pressurized. Experience has shown that the microsphere wall should be equal to or greater than 2% of the diameter for the microsphere to have sufficient strength.

The diameter of the microspheres may be varied for different phosphors. Thus for a gas discharge display having phosphors which emit green, red, and blue light in the visible range, the microspheres for the green phosphor may have an average diameter of the microspheres less than the average diameter of the microspheres for the red phosphor. Typically the average diameter of the green phosphor microspheres is 80 to 95% of the average diameter of the red phosphor microspheres.

The average diameter of the blue phosphor microspheres may be greater than the average diameter of the red phosphor microspheres. Typically the average microsphere diameter for the blue phosphor is 105 to 120% of the average microsphere diameter for the red phosphor.

Because the ionizable gas is contained within a multiplicity of microspheres, it is possible to provide a custom gas at a custom pressure in each microsphere for each phosphor—red, blue, or green.

In the prior art, it is necessary to select an ionizable gas mixture and gas pressure that is optimum for all phosphors used in the device such as red, blue, and green phosphors. However, this requires trade-offs because a particular gas may be optimum for a particular green phosphor, but less desirable for red or blue phosphors. In addition, trade-offs are required for the gas pressure.

In the practice of this invention, an optimum gas mixture and an optimum gas pressure are provided for each of the phosphors-red, blue, green. Thus the gas mixture and gas pressure inside the microspheres may be optimized with a custom gas mixture and a custom gas pressure, each or both optimized for each phosphor emitting red, blue or green light. The diameter of the microsphere can also be adjusted and optimized for each phosphor. Depending upon the Paschen Curve (pd v. voltage) for the ionizable gas mixture, the operating voltage may be decreased by optimized changes in the pressure and diameter.

Although this invention has been described with reference to a plasma display panel structure having opposing substrates for example as disclosed in Wedding 158, and Shinoda et al 500 it may also be practiced in a so-called single substrate or monolithic plasma display panel structure having one substrate with or without a top or front viewing envelope or dome.

Single-substrate or monolithic plasma display panel structures are disclosed by U.S. Pat. Nos. 3,860,846 (Mayer), 3,964,050 (Mayer), and 3,646,384 (Lay), all cited above and incorporated herein by reference.

In one embodiment of this invention, the microspheres are positioned within a single-substrate or monolithic gas discharge structure that has a flexible or bendable substrate.

The practice of this invention is not limited to flat displays. The microspheres may be positioned or located on a conformal surface or substrate so as to conform to a predetermined shape such as a curved surface, round shape, or multiple sides.

The microspheres may be sprayed, stamped, pressed, poured, screen-printed, or otherwise applied to a surface. The surface may contain an adhesive or sticky surface.

Although this invention has been disclosed and described above with reference to dot matrix gas discharge displays, it may also be used in an alphanumeric gas discharge display using segmented electrodes. This invention may also be practiced in AC or DC gas discharge displays including hybrid structures of both AC and DC gas discharge.

What is claimed is:

1. As an article of manufacture, a hollow microsphere having a diameter of less than 100 microns and a gas inside the microsphere at a pressure of at least 10 atmospheres.

2. The invention of claim 1 wherein the microsphere has a spherical geometric shape.

3. The invention of claim 1 wherein the microsphere has an oblate spheroid geometric shape.

4. The invention of claim 1 wherein the microsphere has a prolate spheroid geometric shape.

5. The invention of claim 1 wherein phosphor is deposited on the external surface of the microsphere.

6. The invention of claim 1 wherein there is phosphor inside of the microsphere.

7. The invention of claim 1 wherein the microsphere contains magnesium oxide.

* * * * *